US012589293B2

(12) United States Patent
Anand et al.

(10) Patent No.: US 12,589,293 B2
(45) Date of Patent: Mar. 31, 2026

---

(54) PROVIDING PERSONALIZED CONTENT FOR UNINTRUSIVE ONLINE GAMING EXPERIENCE

(71) Applicant: Microsoft Technology Licensing, LLC, Redmond, WA (US)

(72) Inventors: Rashi Anand, Hyderabad (IN); Venkata Madhu Sravanth Kurumaddali, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 18/288,342

(22) PCT Filed: May 2, 2022

(86) PCT No.: PCT/US2022/027197
§ 371 (c)(1),
(2) Date: Oct. 25, 2023

(87) PCT Pub. No.: WO2022/250877
PCT Pub. Date: Dec. 1, 2022

(65) Prior Publication Data
US 2024/0216798 A1     Jul. 4, 2024

(30) Foreign Application Priority Data

May 28, 2021     (IN) ............................. 202141023935

(51) Int. Cl.
*A63F 13/00*          (2014.01)
*A63F 13/355*        (2014.01)
(Continued)

(52) U.S. Cl.
CPC ............ *A63F 13/355* (2014.09); *A63F 13/53* (2014.09); *A63F 13/61* (2014.09); *A63F 13/67* (2014.09); *A63F 13/335* (2014.09)

(58) Field of Classification Search
CPC ........ A63F 13/355; A63F 13/53; A63F 13/61; A63F 13/67; A63F 13/335
See application file for complete search history.

(56) References Cited

U.S. PATENT DOCUMENTS 7,698,178 B2 *   4/2010   Chu ................... G06Q 30/0209
                                                          705/28
8,533,753 B2 *   9/2013   Briggs ............... H04N 21/2542
                                                          725/32

(Continued)

FOREIGN PATENT DOCUMENTS

EP          2745893 A2      6/2014
EP          3689428 A1      8/2020
(Continued)

OTHER PUBLICATIONS

"International Search Report and Written Opinion Issued in PCT Application No. PCT/US22/027197", Mailed Date: Aug. 26, 2022, 13 Pages.
(Continued)

*Primary Examiner* — Dmitry Suhol
*Assistant Examiner* — Jason Pinheiro
(74) *Attorney, Agent, or Firm* — Schwegman Lundberg & Woessner, P.A.

(57) ABSTRACT

A method for providing content to a user during gameplay includes determining that the user is interacting with a game provided by an online streaming provider and identifying a time frame within the game during which the user's interaction with the game are predicted to be below a threshold interaction count. The method includes identifying a location within the game environment for overlaying content during the time frame and identifying content for displaying to the user. The content is to be displayed via an overlay video stream distinct from a gameplay stream. In real time of the user's gameplay, the overlay video stream is sent to (Continued)

be displayed to the user concurrently with the gameplay stream to provide the content for the user at the identified location during at least a portion of the time frame.

15 Claims, 8 Drawing Sheets

(51) Int. Cl.

| | |
|---|---|
| *A63F 13/53* | (2014.01) |
| *A63F 13/61* | (2014.01) |
| *A63F 13/67* | (2014.01) |
| *A63F 13/335* | (2014.01) |

(56) References Cited

U.S. PATENT DOCUMENTS

| | | | | |
|---|---|---|---|---|
| 10,878,661 | B2 * | 12/2020 | Burgin | G07F 17/3239 |
| 11,727,756 | B2 * | 8/2023 | Burgin | G06Q 30/0209 |
| | | | | 700/91 |
| 11,765,406 | B2 * | 9/2023 | Ramaswamy | |
| | | | | H04N 21/440245 |
| | | | | 386/230 |
| 2005/0264583 | A1 * | 12/2005 | Wilkins | G09G 5/397 |
| | | | | 345/629 |
| 2011/0184805 | A1 * | 7/2011 | Margalit | G06Q 30/0251 |
| | | | | 705/14.49 |
| 2012/0047542 | A1 * | 2/2012 | Lewis | H04N 21/44016 |
| | | | | 725/97 |
| 2013/0061262 | A1 * | 3/2013 | Briggs | H04N 21/8455 |
| | | | | 725/32 |
| 2018/0068526 | A1 * | 3/2018 | Burgin | G06Q 30/0277 |
| 2018/0236361 | A1 | 8/2018 | Ninoles et al. | |
| 2019/0075339 | A1 * | 3/2019 | Smith | H04N 21/25883 |
| 2020/0108316 | A1 | 4/2020 | Nay | |
| 2020/0346114 | A1 * | 11/2020 | Verma | A63F 13/53 |

FOREIGN PATENT DOCUMENTS

| | | |
|---|---|---|
| WO | 2014078452 A1 | 5/2014 |
| WO | 2016022279 A2 | 2/2016 |
| WO | 2019217104 A1 | 11/2019 |
| WO | 2020068220 A1 | 4/2020 |
| WO | 2020222958 A1 | 11/2020 |

OTHER PUBLICATIONS

Invitation to file search results or a statement of non-availability pursuant to Rule 70b(1) EPC received in European Application No. 22724575.0, mailed on Aug. 16, 2024, 1 page.

Communication pursuant to Article 94(3) received in European Application No. 22724575.0, mailed on Feb. 5, 2025, 6 pages.

* cited by examiner

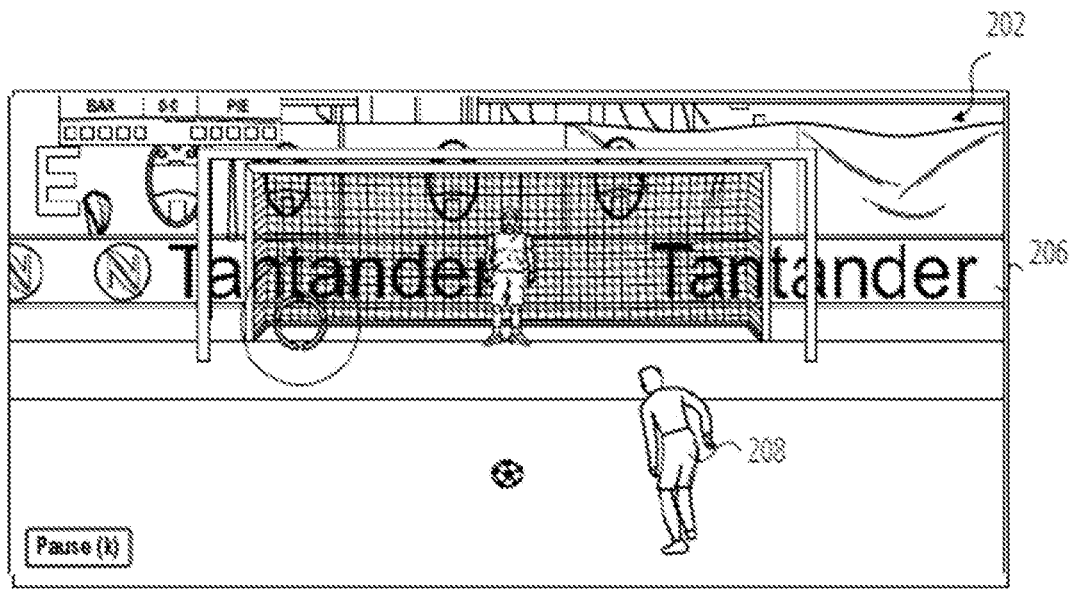
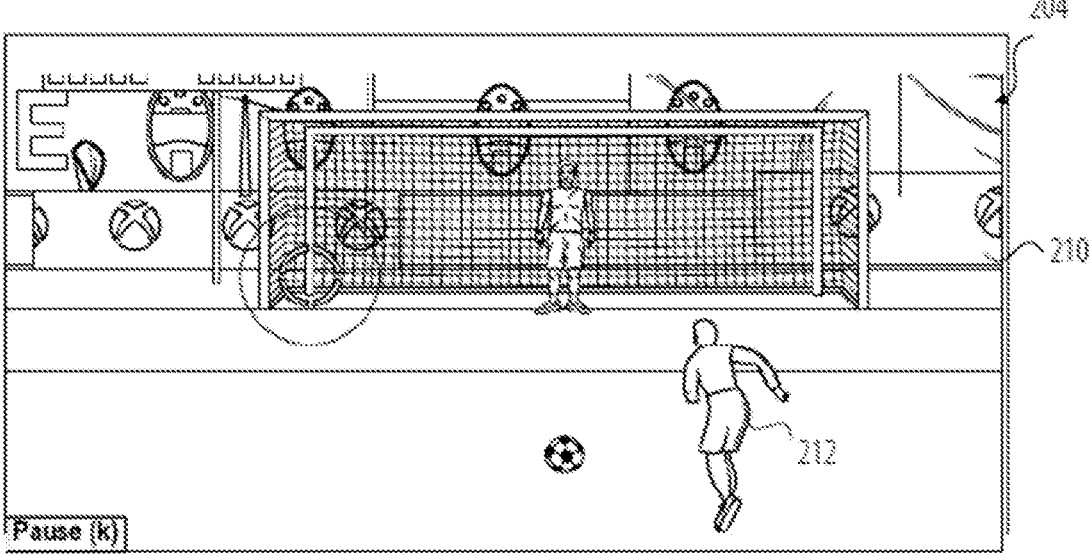
FIG. 2

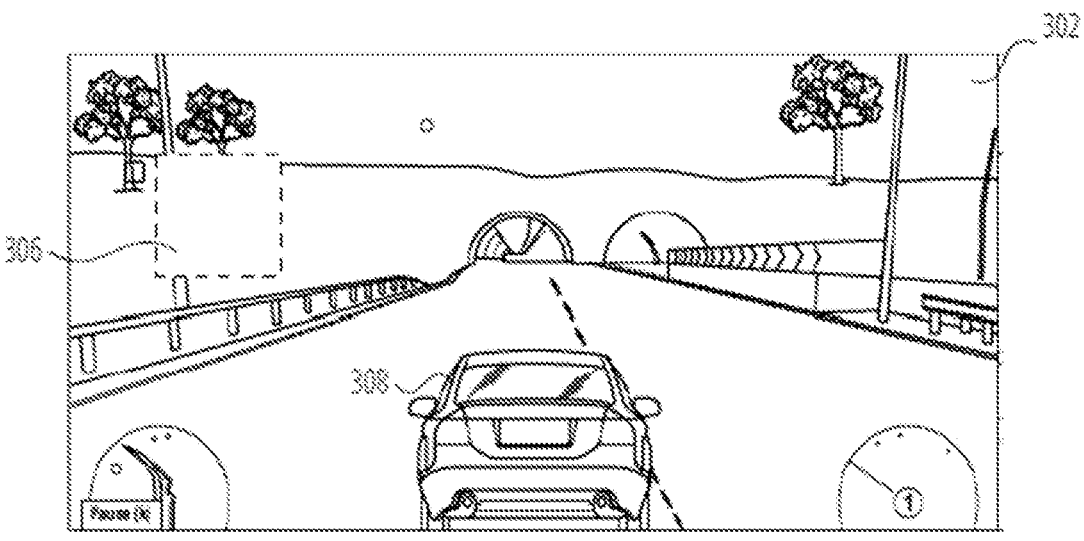
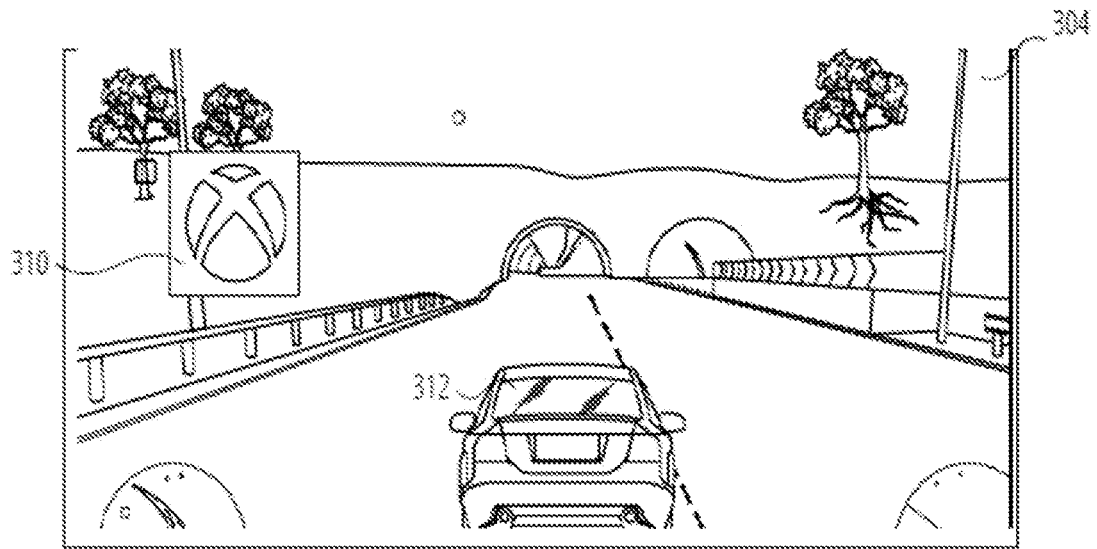
FIG. 3

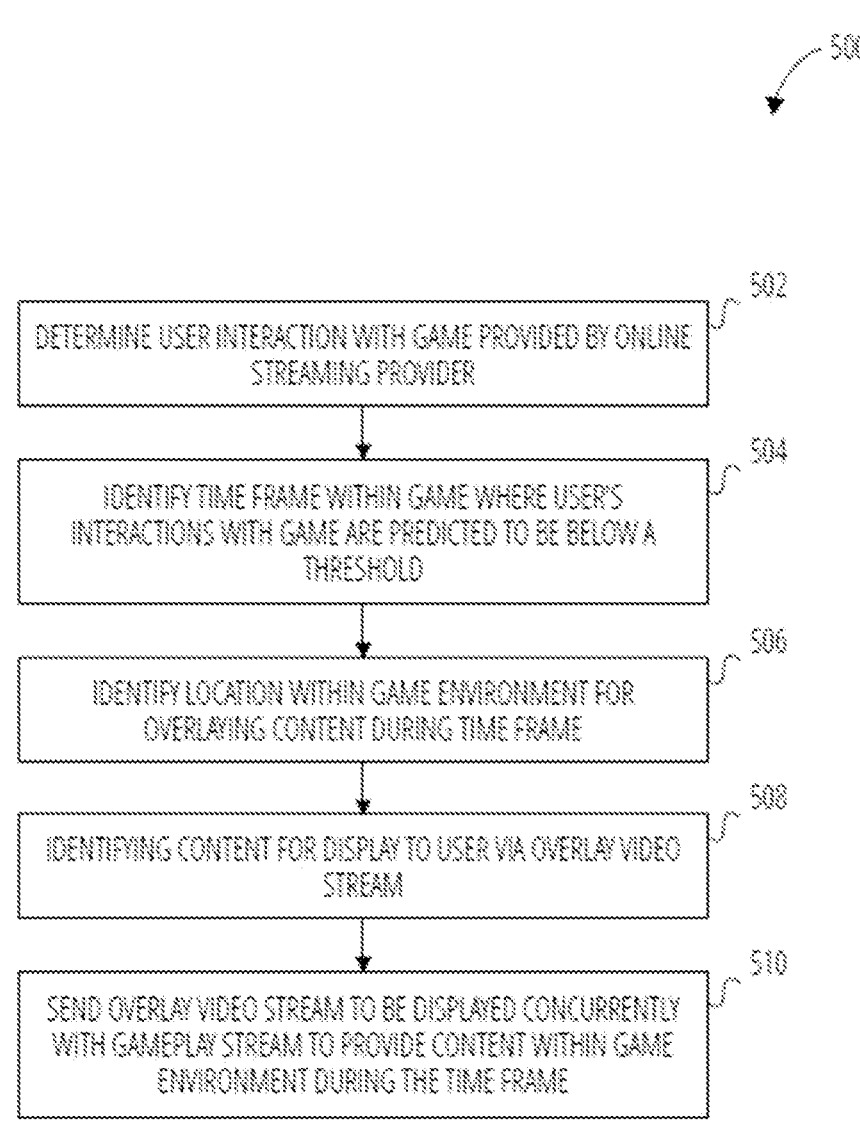

500

502

DETERMINE USER INTERACTION WITH GAME PROVIDED BY ONLINE STREAMING PROVIDER

504

IDENTIFY TIME FRAME WITHIN GAME WHERE USER'S INTERACTIONS WITH GAME ARE PREDICTED TO BE BELOW A THRESHOLD

506

IDENTIFY LOCATION WITHIN GAME ENVIRONMENT FOR OVERLAYING CONTENT DURING TIME FRAME

508

IDENTIFYING CONTENT FOR DISPLAY TO USER VIA OVERLAY VIDEO STREAM

510

SEND OVERLAY VIDEO STREAM TO BE DISPLAYED CONCURRENTLY WITH GAMEPLAY STREAM TO PROVIDE CONTENT WITHIN GAME ENVIRONMENT DURING THE TIME FRAME

PROVIDING PERSONALIZED CONTENT FOR UNINTRUSIVE ONLINE GAMING EXPERIENCE

CLAIM OF PRIORITY

This application is a U.S. National Stage Filing under 35 U.S.C. 371 of International Patent Application Serial No. PCT/US2022/027197, filed May 2, 2022, and published as WO 2022/250877 A1 on Dec. 1, 2022, which claims the benefit of priority to India patent application No. 202141023935, filed May 28, 2021, which applications and publication are incorporated herein by reference in their entirety.

TECHNICAL FIELD

The present disclosure generally refers to generating and presenting personalized content for unintrusive online gaming in accordance with some embodiments.

BACKGROUND

Cloud-based gaming platforms are gaining popularity as streaming gameplay allows users having varying technical and hardware capabilities to enjoy games that were previously unavailable with such varying technical and/or hardware capabilities. A cloud-based gaming platform allows users to enjoy hundreds of different games on their mobile devices (e.g., laptop, cell phone). Presently, these available games do not presently provide personalization options that would provide a richer gaming experience. A method and system for providing users with immersive, personalized content through the online or cloud-based gaming platform is desired.

SUMMARY

Computer games are becoming increasingly popular with the availability of cloud-based gaming platforms. Users enjoy the ability to select and play games from the comfort of their own computers without committing to costly gaming consoles. To add interest and immersive enjoyability of the available games, personalization options are contemplated. Users are more inclined to play games that include features that are specific to their interests. As an example, users may select games with flexible personalization options including content overlay of their favorite sports teams, brands, colors, and more. Providing individually tailored custom gameplay experience may be difficult to create without adding various features to the original game. Further, generating and developing unique content for each player would require tremendous efforts by the development team that will prove costly and cumbersome. To provide such personalization options without altering the original game itself poses a technical challenge.

Embodiments of the present disclosure include a method and system for providing real-time personalized content to users within the gameplay of the streamed game. In some embodiments, a method for providing personalized content includes determining that a user is interacting with a game provided by an online streaming provider and identifying a first time frame within the game during which the user's interactions with the game are predicted to be below a threshold interaction count. The method includes identifying a location within the game environment for overlaying content during the first time frame and identifying content for display to the user. The content is to be displayed by way of an overlay video stream that is distinct from a gameplay video stream. detecting a user interaction with a game provided by an online streaming provider via gameplay stream. The method includes predicting a time frame during which user interactions with the game is below an average interaction count and identifying a location within a frame of the game for overlaying content. The method further includes identifying content for display to the user via overlay video stream distinct from the gameplay stream, and in real time of the gameplay, sending the overlay video stream to be displayed concurrently with the gameplay stream to provide the content for the user at the location within the frame of the game during the time frame.

In some embodiments, the method includes predicting the time frame by obtaining, from a database of past user gameplay, recordings of the gameplay, identifying past user interactions with the game within each recording, where each past user interaction has a corresponding game time. The method further includes aggregating the past user interactions to identify time frames having an aggregated count of user interactions below the threshold interaction count. The identified time frames are stored as candidate portions of the gameplay for displaying content.

In some embodiments, identifying the location within a frame of the game for overlaying content includes obtaining, from a database of past user gameplay, recordings of the gameplay, identifying locations within the game environment that are continuously visible to a respective user during gameplay for at least a threshold time period. The method includes aggregating the identified locations to identify a subset of locations having a count within the aggregated identified locations meeting or exceeding a predetermined threshold and storing the subset of locations from the identified locations.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like. This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE DRAWINGS

The disclosed aspects will hereinafter be described in connection with the appended drawings that are provided to illustrate and not to limit the disclosed aspects.

FIG. 2-4 are example gaming interfaces showing various gaming environments in accordance with some embodiments.

FIG. 5 is an example flow diagram for generating personalized content for online gaming in accordance with some embodiments.

DETAILED DESCRIPTION

Figure 1:
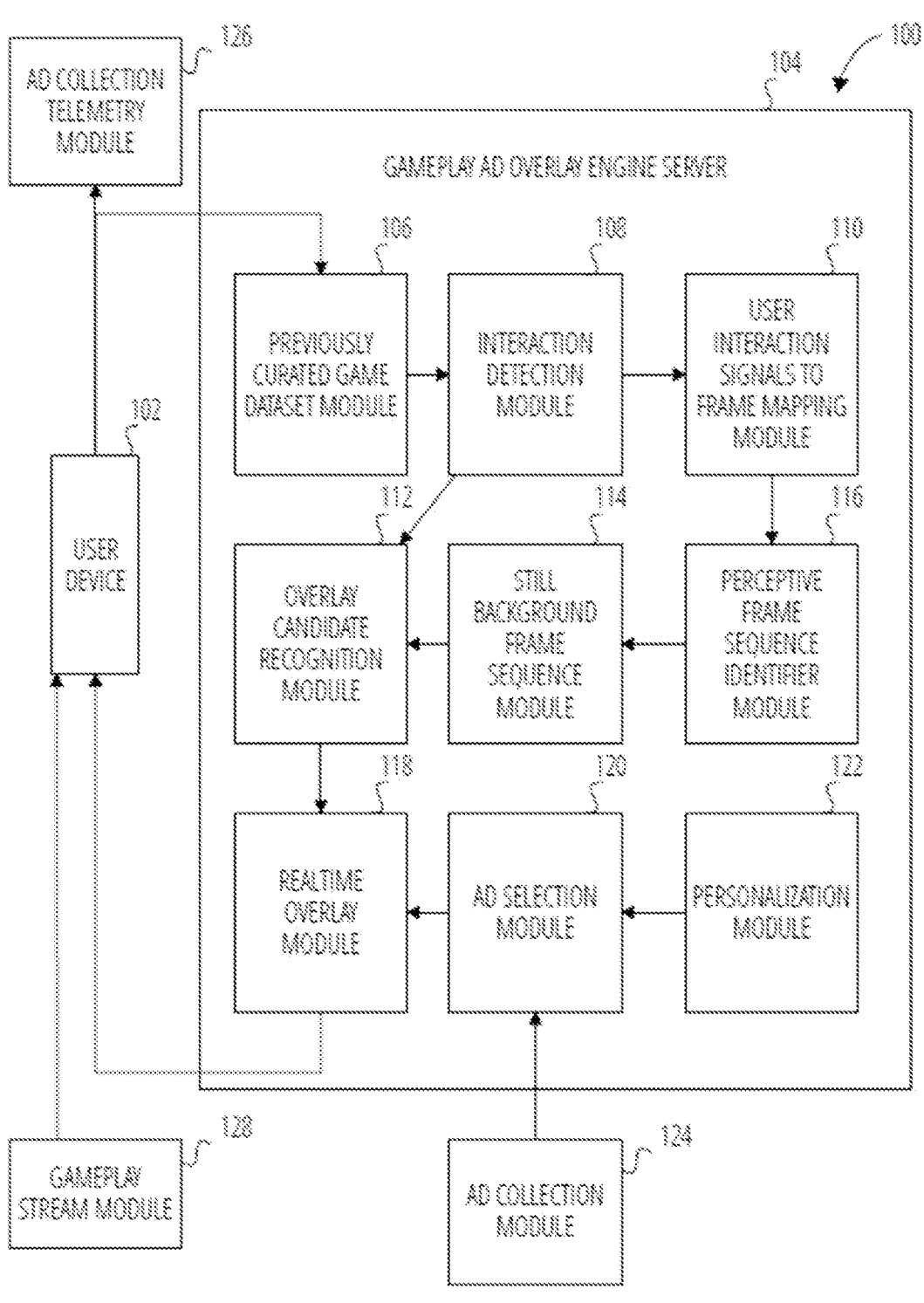
FIG. 1 is a block diagram of an example computer system providing personalized content for unintrusive online gaming experience in accordance with some embodiments.

A particular technical problem or challenge exists in providing personalized content within gameplay of a game without modifying the underlying or original game. Traditionally, editing or altering the gameplay environment requires a software developer or similar technical expert to provide the edits to the game. Having a developer or software programmer edit and update the gameplay for each user of the game is impractical and does not provide room for dynamic content placement or much scalability.

Users or players of games have previously expressed their desire to add personalization options for added enjoyment of the game as well as to differentiate themselves from other users. A technical problem exists as it is almost impossible to provide a different version of a game to each user to allow the user to have a unique, customized gameplay experience. However, the desire for a personalized gaming experience remains.

Having a computer implemented system that provides a seamless integration between gaming and content placement without changing the underlying game is advantageous in many ways. The disclosed system can be integrated into cloud-based gaming platforms to provide smart advertisements in live streams of games. By providing personalized content to users without losing the inherent quality of the game, users can enjoy the game without interruption and in some situations, without providing any payment.

Additionally, as computer and video games have sophisticated graphic design built into the game, it is advantageous to have the technical solution of providing personalized advertisements to the user during gameplay without affecting the quality of the graphic design of the original game. The methods and systems described herein ensure minimum intrusion within the gameplay environment, allowing maximum user engagement with the game all while providing valuable and immersive personalized content. For example, a game may include a user interacting with a bedroom. The bedroom may include a gallery of photos on the wall. The gallery of photos can be replaced by the user's own photographs instead of generic stock photos that may have been selected by the game developers.

Further, a useful technical solution of providing content to a user through an overlay stream allows streaming service providers the flexibility and control of the content, increasing engaged user base, all without sacrificing the quality of the game itself.

Methods and systems disclosed herein provide un-intrusive, personalized content for users during video/computer game play. Additionally, the methods and systems disclosed provide a solution for providing personalized content to users in a single process without altering the underlying game produced by the developers. As an example, users who are playing games online may opt for a free version of the game that includes various content (e.g., ads) overlaid within the gameplay instead of paying for access to the games. However, the overlaid content can generate income even without the user paying a subscription for the gameplay.

It is understood that this solution is not solely reserved for providing personalized content to users of a gaming service but may include any application providing content to users via video streams.

The inventive subject matter will now be discussed with reference to several example implementations. It is to be understood that these implementations are discussed for enabling those skilled in the art to better understand and thus implement the embodiments of the present disclosure, rather than suggesting any limitations on the scope of the present disclosure.

Examples disclosed herein are directed to methods, apparatus comprising several modules and apparatus comprising one or more processors and memory embodied with executable instructions for providing personalized content as an overlay stream within gameplay.

Having generally provided an overview of some of the disclosed examples, attention is drawn to the accompanying drawings to further illustrate some additional details. The illustrated configurations and operational sequences are provided to aid the reader in understanding some aspects of the disclosed examples. The accompanying figures are not meant to limit all examples, and thus some examples may include different components, devices, or sequences of operation while not departing from the scope of the disclosed examples discussed herein. In other words, some examples may be embodied or may function in different ways than those shown.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

FIG. 1 illustrates a block diagram of an example computer system providing personalized content for unintrusive online gaming experience in accordance with some embodiments. System 100 provides personalized content for display to a user device 102 using a gameplay ad overlay engine server 104 including various sub-systems (also referred to as modules). An intelligent interaction detection module 108 includes a library of data curated by previously recorded gameplay from users. Interaction detection module 108 may receive inputs from a previously curated game dataset 106. The intelligent interaction detection module 108 can identify portions within the gameplay experiencing the least amount of user interaction and identify potential scenarios for personalized advertisement placement within the game. The output of the interaction detection module 108 is stored in user interaction signals to frame mapping module 110, a database of user interaction signals corresponding to the matching frames within the gameplay.

A perceptive frame sequence identifier module 116 receives the frames of the recorded game sessions (e.g., from intelligent interaction detection module 108). These frames are received as an input to perceptive frame sequence identifier module 116 which processes these frames to identify the background. Consecutive frames are compared to identify the background and/or locations within the background that are suitable for ad placement. The perceptive frame sequence identifier module 116 then outputs a directory of such consecutive frames (also referred to herein as clips) to be stored in still background frame sequence module 114. In some embodiments, the frame clips are filtered to find the exact frame sequence where the background or portions of the background is still (e.g., does not change from frame to frame). An overlay candidate recognition module 112 receives inputs from the intelligent interaction detection module and/or perceptive frame sequence identifier module 116. In some embodiments, overlay candidate recognition module 112 includes a machine learning model. The machine learning model of overlay candidate recognition module 112 uses the inputs of interaction detection module 108 and still background frame sequence module 114 to provide a suggested time frame and location within the gaming environment for overlaying the content.

Figure 8:
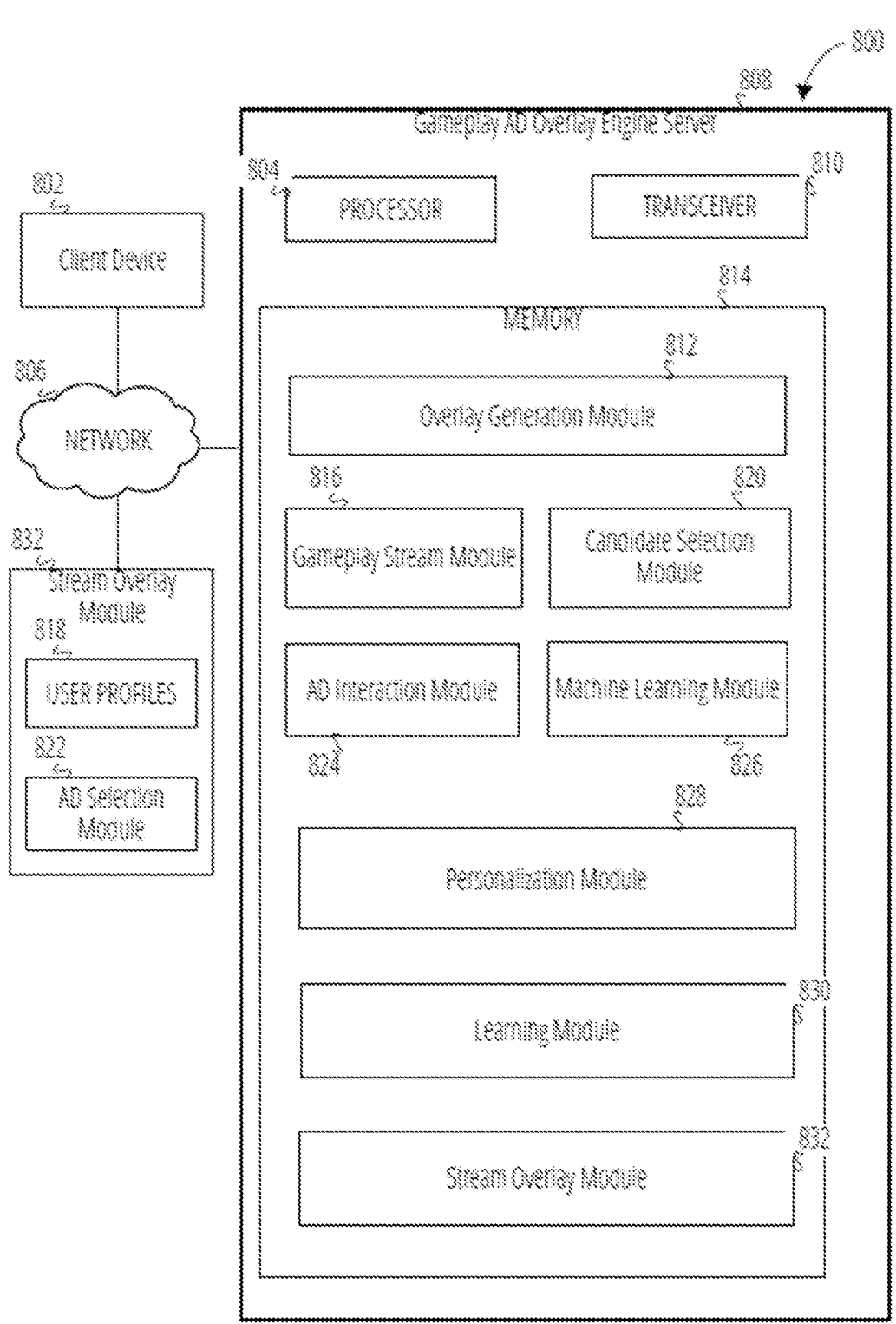
FIG. 8 is a block diagram of a computer system to implement one or more example embodiments.

The personalization module 122 is used to identify personalization signals from the user's account information, metadata, history, bookmarks, among others, to identify categories of ads to be shown to the user via overlay stream. For example, a user has been browsing online retailers for a pair of running shoes. The personalization module 122 can determine that based on the user's browsing activity, a potential category of personalized content to be shown to the user includes running shoes. In some embodiments, Personalization module 122 is the same as, similar to, or receives data from personalization module 828 (FIG. 8).

The content selection module 120 may receive inputs from the personalization module 122 and from a library of advertisements received from content providers (e.g., customers). The content selection module 120 also receives input signals from the current game selection to provide real time content candidates suitable for the current game. As described herein, real time is meant to describe a timing without interrupting delivery of the user game, during the play or experience of the game by a user. Ad selection module 120 receives the input from the Personalization module 122 and ads from ad collection module 124 which have been provided by advertisement providers. The ad selection module 120 determines which advertisement to select based on the personalization module 122 and the available advertisements from the ad collection module 124. In some embodiments, the ad selection module 120 may be used to select personalized content for the user that is not necessarily an ad. The ad selection module 120 may be further configured to select user provided images, stock photos, and other readily available content for providing to the user. Content selection module 120 may verify the location, placement, and sizing of the content (e.g., advertisement, memo, announcement) will conform to the location and placement of the advertisement in the overlay stream over the game play. The content selection module 120 can provide personalized ads based on the user/gamer's profile and category of content suitable for the current game. For example, a user/gamer is playing a car racing game. The personalization module 122 may provide categories of a content that include running shoes, tennis gear, and car modification kits. Based on the context of the game (e.g., racing game), the category of content selected for overlay may be car modification kits.

A real-time overlay module 118 receives an input from the overlay candidate recognition module 112 module, content selection module 120, and personalization module 122. The real-time overlay module 118 may use a matching algorithm to ensure the overlay stream including the overlay content matches the gameplay stream and are both displayed concurrently to the user at the user device 102.

Previously curated game dataset module 106 includes recordings of previously played games. In some embodiments, the interaction detection module 108 receives the recordings of previously played games as training data for a machine learning model within interaction detection module 108. The user interaction signals to frame mapping module 110 may include a library of user interaction signals that are mapped to the corresponding frames. For example, for a user interaction with a game where the user is interacting with the game and kicking a soccer ball toward the goal, the user interaction of kicking the soccer ball is stored and mapped to the frame of the game where the user is able to kick the ball toward the goal. Additionally, the user interaction signals to frame mapping module 110 can aid in identifying which frames of the gameplay are associated with the least amount of user interaction.

The still background frame sequence module 114 receives frames of the gameplay identified by perceptive frame sequence identifier module 116 and identifies which frames have still (non-moving) background areas. These non-moving background areas marked as they are ideal for overlaying advertisements. In some embodiments, the still background frame sequence module 114 is used to identify locations with the game environment that are continuously visible to a respective user during gameplay for at least a threshold time period for the respective user. By ensuring that the game environment includes locations that are continuously visible to a user, the provided content has adequate time and probability of being consumed by the user.

The still background frame sequence module 114 provides information related to the non-moving background areas to overlay candidate recognition module 112 that further determines whether various candidates having non-moving background areas are ideal for providing advertisements to users. The overlay candidate recognition module 112 may consider background location, typical user focus (eye/vision placement), time frame (e.g., number of frames where the background of the gameplay is the same), among other factors. The real-time overlay module 118 processes the overlay candidate information received from the overlay candidate recognition module 112 as well as the selected advertisement from ad selection module 120 The real-time overlay module 118 may also calculate the exact timing needed to place the overlay stream for viewing by the user, at the same time the game is being played. Gameplay Stream module 128 may send the User Device 102 a separate video stream of the gameplay. In some embodiments, the gameplay stream module receives the overlay stream from real-time overlay module 118 and provides both video streams to the User Device 102. The ad collection telemetry module 126 may receive feedback from the Gameplay Stream module 128 and/or the User Device 102 of the level of success of the placed advertisement.

FIG. 2 illustrates an example frame within gameplay of a game in accordance with some embodiments. Example scene 202 is a frame, or otherwise described as a gaming environment, within the gameplay including player 208 and banner 206 in the background of the frame.

Example scene 202 is an example of a scene (virtual reality scene) provided by the original game designers for traditional gameplay. Example scene 204 is an example of the same scene as shown in example scene 202 shown concurrently with an overlay stream.

As described herein, methods and systems are described to provide an overlay stream to be streamed to a receiving device (e.g., client device 702 in FIG. 7, user device 102, FIG. 1) along with the original gaming stream. Example scene 204 includes player 212 and shows the banner 210 having an overlay of the original banner 206 that replaces the "Tantander" banner with Xbox logos. The Xbox logos are provided within the context of FIG. 2 as an example advertisement to be provided to a user. The original banner 206 may be identified as content space. Here, the space is a space between a soccer field court and stands in the virtual environment, similar to banner space commonly found in soccer field like environments where sponsorship text and logos are typically placed.

Various other content may be provided to different users, or even to the same user. For example, player A is playing a virtual soccer game and views content X on Day 1. Player A may view content Y on Day 2. Player B may also view content X on Day 2. Various configurations of the described embodiment are contemplated and considered part of this disclosure. It is understood that example scenes 202 and 204 are examples of scenes that may or may not be from the same frame of a gameplay stream but may be within a set of consecutive frames. In some embodiments, user interaction with the game environment may cause the content to be obstructed. For example, a user is moving the user's avatar across the soccer field in preparation for the penalty kick. The movement of the user's avatar may obstruct and unobstruct the user's view of the content. This feature allows seamless integration of the content into the game and provides a more natural gaming experience. FIG. 3 illustrates an example frame within gameplay of a racing game in accordance with some embodiments. Example scene 302 is a frame within the gameplay including car 308 and blank space 306. Similarly, example scene 304 is a frame within the gameplay including car 312 but with an identified ad space 310. The methods and systems described herein determines the user's position within the gameplay, identifies a time frame of which the user has the least number of interactions with the game (e.g., while driving the car down a straight path) and selects content to be displayed to the user as an immersive yet unintrusive experience during gameplay.

In some embodiments, the methods and systems described herein identify locations or objects within the scene of the gameplay traditionally used as a medium for displaying content and designating the object as the location. In an example, example scene 302 includes an identified ad space 310. The identified ad space 310 may be a billboard, banner space, or similar medium traditionally used to display advertisements in the physical world. The identified ad space may also constitute space within the game that does not include objects or various characters that do not inhibit the user interaction experience with the game. Identifying traditional medium used for advertising allows for a seamless integration for the user in the virtual world and may effectively provide the content to the user. The overlay stream is configured to provide an advertisement without interrupting the gameplay or having to modify the underlying game itself. Further, the identified locations may be specifically selected as locations that are not interactable by the player. Meaning, the player will not be hindered by the content placement. For example, a billboard, a sky, a door, or various other objects are identified by the game as being static objects that are not within user interaction capabilities. By selecting locations for content placement that are uninteractable by the user, the user is not frustrated by the inability to interact with an object because of the overlaid content.

Figure 4:
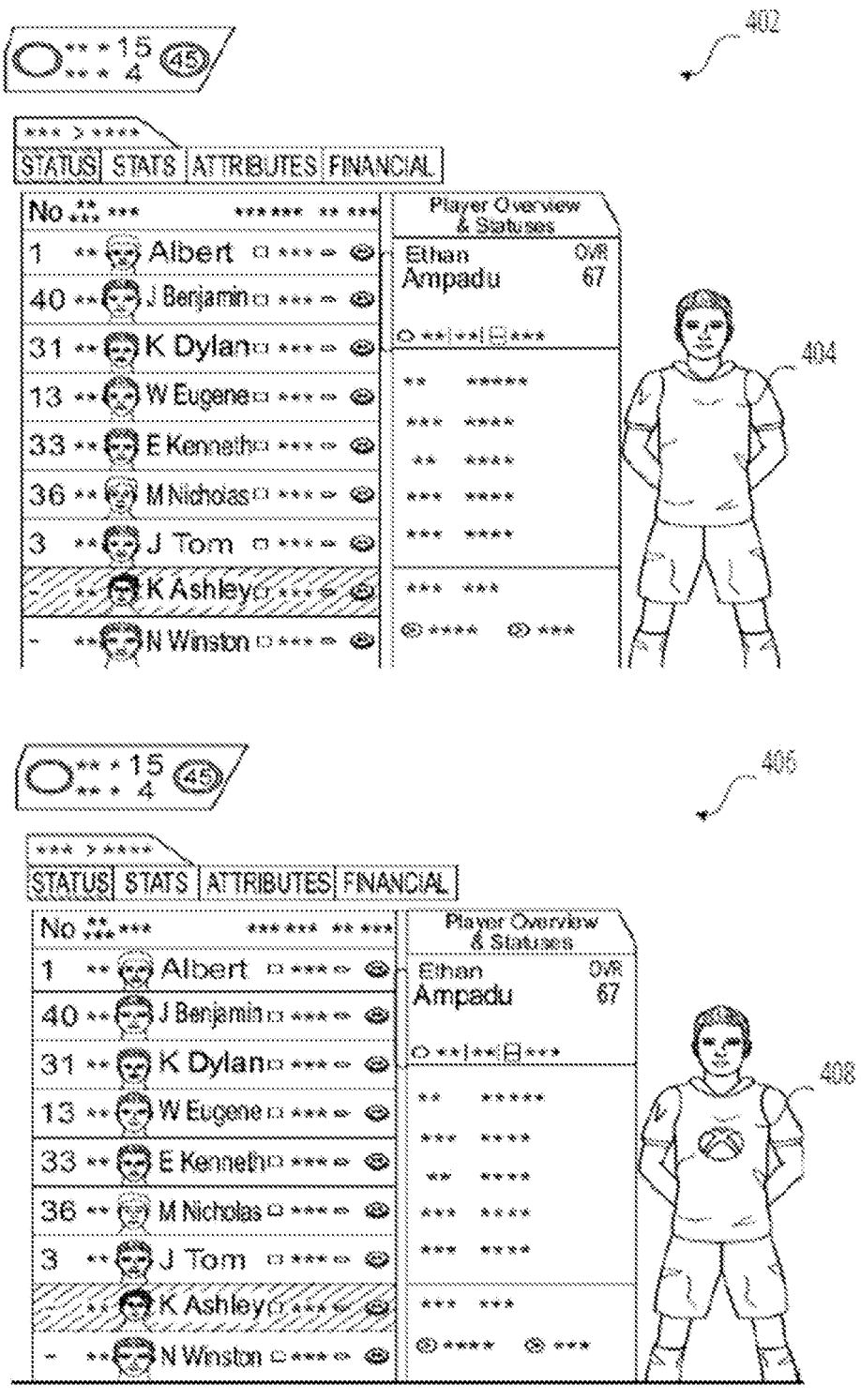

FIG. 4 illustrates an example frame within gameplay of a game in accordance with some embodiments. Example scene 402 includes a frame showing user statistics, the player overview, and figurine 404. Example scene 406 includes a frame showing user statistics, the player overview similar to example scene 402. However, in example scene 406, figurine 408 is configured to display an Xbox logo. An overlay stream is configured to provide the Xbox logo for display on a torso portion of the figurine. In some embodiments, the overlay stream is configured to provide the content (e.g., ad) on various other locations within the figurine. For example, figurine 408 may include several content items at various locations that have been identified as ad space, such as on the chest, arms, shorts, and socks. Additionally, it is understood that more than one content item can be shown on the figurine concurrently via overlay stream.

FIG. 5 depicts an example method 500 for providing personalized content for unintrusive online gaming experience in accordance with some embodiments. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 500 begins at operation 502 where a computing device determines that a user is interacting with a game provided by an online streaming provider. In some embodiments, the computing system receives an indication that a user has instantiated a gaming session with a game provided by a streaming provider. In some embodiments, an input command count rate is detected and compared to a threshold to determine a user's present interaction with the game. In some embodiments, the game is an online game provided by a streaming service (e.g., Xcloud).

The computing device then identifies, a first-time frame within the game during which the user's interactions with the game are predicted to be below a threshold interaction count at operation 504. In some embodiments, a sub-system such as interaction detection module 108 may be called upon to provide such predictions. In some embodiments, a threshold of number of interactions varies between various games. For example, game A is a fast-paced shooting game and receives a high number of user interactions per minute and game B is a slow-paced golfing game. For game A, the threshold interaction is higher than the threshold interaction count for game B, which is a golfing game.

At operation 506, the computing device identifies a location within the game environment for overlaying content during the first-time frame. For example, the computing device identifies a banner area such as shown in FIG. 2 that provides ample space for displaying AD content during a time period where the user's interaction with the game is lower than a threshold interaction count. Users are more likely to view and recognize displayed content when their interaction with the game is low. When user interaction with the game is high, the user is unlikely to notice the content. In some embodiments, when user interaction with the game is high, providing content may hinder the gameplay experience. The system is configured to refrain from providing content to a user when the user's interaction with the game is higher than a threshold interaction count. The threshold interaction count may be set by the developer of the original game, the streaming service provider, the content provider, or configured by any other suitable means.

In some embodiments, the computing device identifies the location using machine learning algorithms trained to detect objects within the gaming environment corresponding to objects that are traditionally used for displaying content. In some embodiments, predefined areas are selected and identified by developers of the original game. In some embodiments, various algorithms including machine vision techniques are used to identify locations that are suitable for displaying content.

The method 500 further includes identifying content for display to the user at operation 508. The content is to be displayed to the user by way of an overlay video stream that is distinct from the original gameplay stream. In some embodiments, identifying content for display includes selecting, from a candidate pool of content, a suitable content for display. For example, a rectangular billboard may be selected at operation 506 as being the location for displaying content. For the selected billboard, content in a square format may not be suitable. A rectangular-shaped content is selected from the candidate pool for displaying.

At operation 510, the computing device sends, in real time of the gameplay, an overlay video stream to be displayed concurrently with the gameplay stream to provide the content for the user at the location within the game environment during at least a portion of the first-time frame. In some embodiments, both the overlay and gameplay streams may be provided by a single provider, however the video streams remain distinct video streams. In some embodiments, a single provider may combine the two video streams before providing the combined video stream to the user. In some embodiments, each of the overlay and gameplay streams are provided by distinct video streaming providers. Both of the gameplay and overlay streams are provided to the user at the computing device to be displayed concurrently to provide a seamless video stream of gameplay with the overlaid content without interrupting the functionalities and performance of the game.

Figure 6:
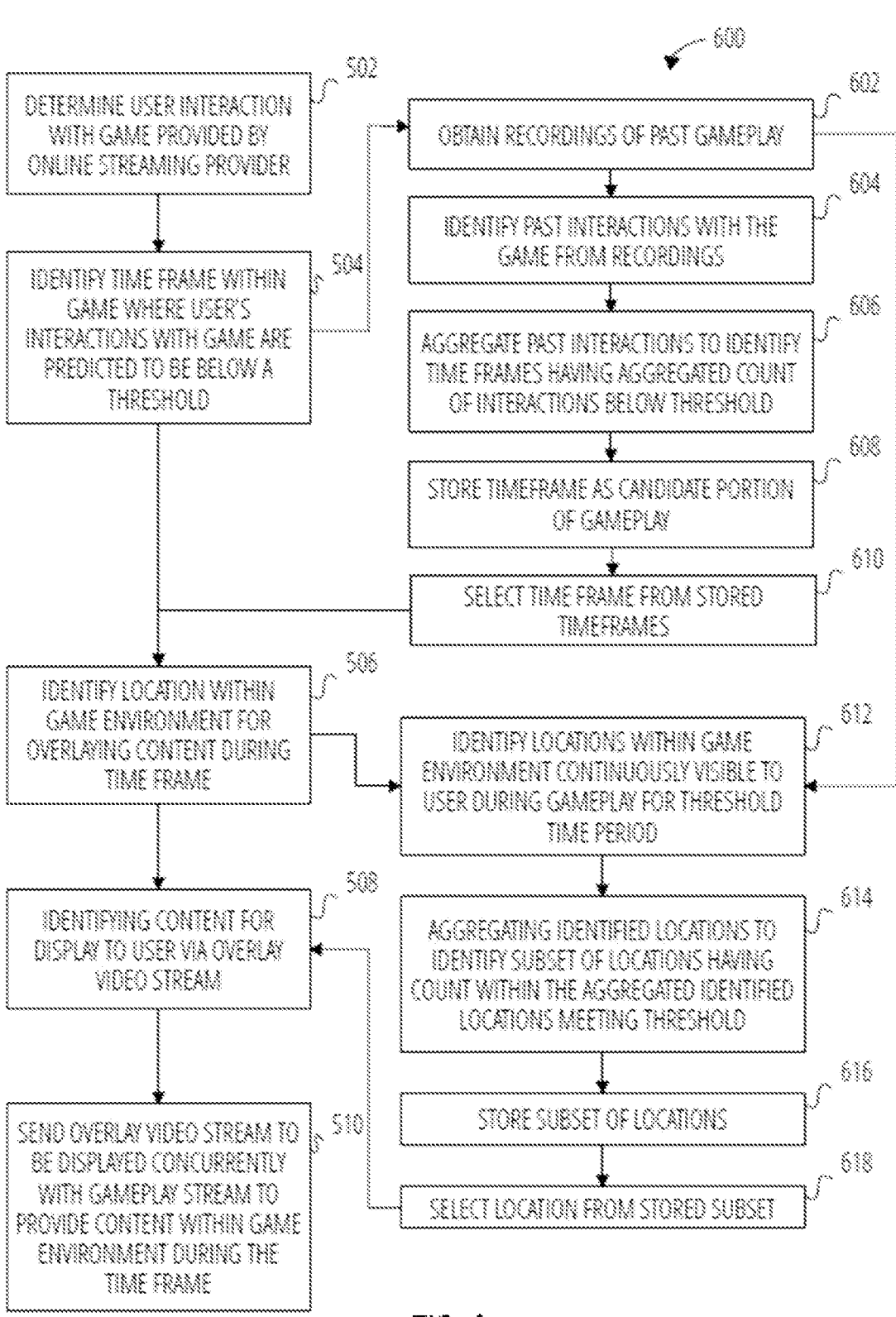
FIG. 6 is an example flow diagram for generating and providing personalized content for unintrusive online gaming in accordance with some embodiments.

FIG. 6 depicts an example method 600 for providing real-time personalized advertisement displays for online gaming during ongoing gameplay using machine learning methods in accordance with some embodiments. Method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Method 600 includes various operations that coincide and overlap with operations from method 500. A computing device, at operation 502, determines that a user is interacting with a game provided by an online streaming provider. In response, the computing device at operation 504 identifies a time frame within the game during which the user's interactions with the game are predicted to be below a threshold interaction count. To identify the time frame, in some embodiments, the computing device obtains recordings of past gameplay of the same game from a database (e.g., Previously curated game dataset module 106) at operation 602. In some embodiments, recordings of past gameplay may be saved and stored by interaction detection module 108. The method continues at operation 604 as the computing device identifies, within each recording, past user interactions with the game. Each past interaction has a corresponding game stage having a specific timing. For example, game A is played by anonymous user B and at game times X to Y, anonymous user B's interaction with game A is below a threshold interaction count.

In some embodiments, at operation 606, the computing device aggregates the past user interactions to identify time frames as having an aggregated count of user interactions below the threshold interaction count. Continuing with the example given above with respect to operation 604, the computing device aggregates past user interactions with the game from a collection of recorded past user gameplay. This provides a large dataset from which to identify game time corresponding to a count of user interactions below the threshold.

In another example, if a user is playing a racing game such as shown in FIG. 3 and the user is driving the car down a straight path for approximately 5 seconds. The computing device is configured to identify that for the duration of the straight path, the user has minimal interactions with the game (as the car is generally preconfigured to drive in a straight path without user interaction). The computing device at operation 608 stores the timeframe (e.g., 5 seconds of the straight path of the racing game) as a candidate portion of gameplay for overlaying content. At operation 610, the computing device selects the first-time frame from the stored time frames. Operations 602-610 may be performed while the user is playing the game, prior to gameplay, or in preparation for gameplay.

The method 600 continues at operation 506 as the computing device identifies a location within the frame of the game for overlaying content. In some embodiments, the computing device obtains recordings of past gameplay at operation 602 and the recordings are used to identify locations with the game environment that are continuously visible to a respective user during gameplay for at least a threshold time period for the respective user (operation 612). In some embodiments, at operation 614, the computing device aggregates the identified locations to identify a subset of locations having a count within the aggregated identified locations meeting or exceeding a predetermined threshold. For example, the computing device, identifies, from the recordings of past gameplay, there are 4 locations within the gameplay that are continuously visible and do not become blocked by objects within the scene or through user interactions. Of the identified 4 locations, 3 of them are continuously visible for the threshold period of time (e.g., 5 seconds). The computing device may then store the 3 locations as a subset of identified locations that are potential locations for placement of content (operation 616). In another example, the computing system identifies a plurality of chronological frames of gameplay having a variability between each of the frames below a predetermined threshold. For example, a gameplay for a soccer penalty shootout has 30 chronological frames of gameplay with low variability as the view of the game remains relatively stable. The computing device selects a set of frames from the plurality of chronological frames. In some embodiments, the computing device may select all of the identified frames. The set of 30 chronological frames may include an area within the background having a series of consecutive pixels having the same coloring. The portion within the background is selected based on a visibility within the background (e.g., within viewing range, at eye level) as well as being a homogenous coloring. Other factors may be considered when selecting the portion within the background as the location for overlaying content. The computing device then selects, at operation 618, the location for overlaying content from the stored subset of identified locations.

It is understood that in some situations, the computing device may identify that there is not an optimal location within the frame of the game for overlaying content and determine to forgo sending an overlay stream to the user.

Method 600 continues at operation 508 as the computing device then identifies content for display via overlay video stream. The overlay video stream is distinct from the gameplay stream and displayed concurrently with the gameplay stream to the user to provide a filtered, or overlaid effect. In some embodiments, content is selected based on the user's profile, settings, or history. In some embodiments, the identified content is modified to conform to the size, color, and/or location of the selected background portion for the location of the content. For example, a background location of size 40×40 dark blue pixels is selected for the content. The content selected for the specified location is 50×50 pixels and is in a black colorway. For visual integration, the content is modified to resize and recolor the content to a 40×40 size and a dark blue colorway. Other various modifications to the content are contemplated and considered part of this disclosure.

The identified content at operation 508 is then sent via overlay video stream to be displayed concurrently with the user's gameplay stream at operation 510. The content is configured to be displayed at the location of the frame selected in operation 616 for the duration of the time frame identified at operations 602 to 608.

The operations of method 600 may be repeated for multiple timeframes within the gameplay to provide overlaid content via content overlay stream.

Figure 7:
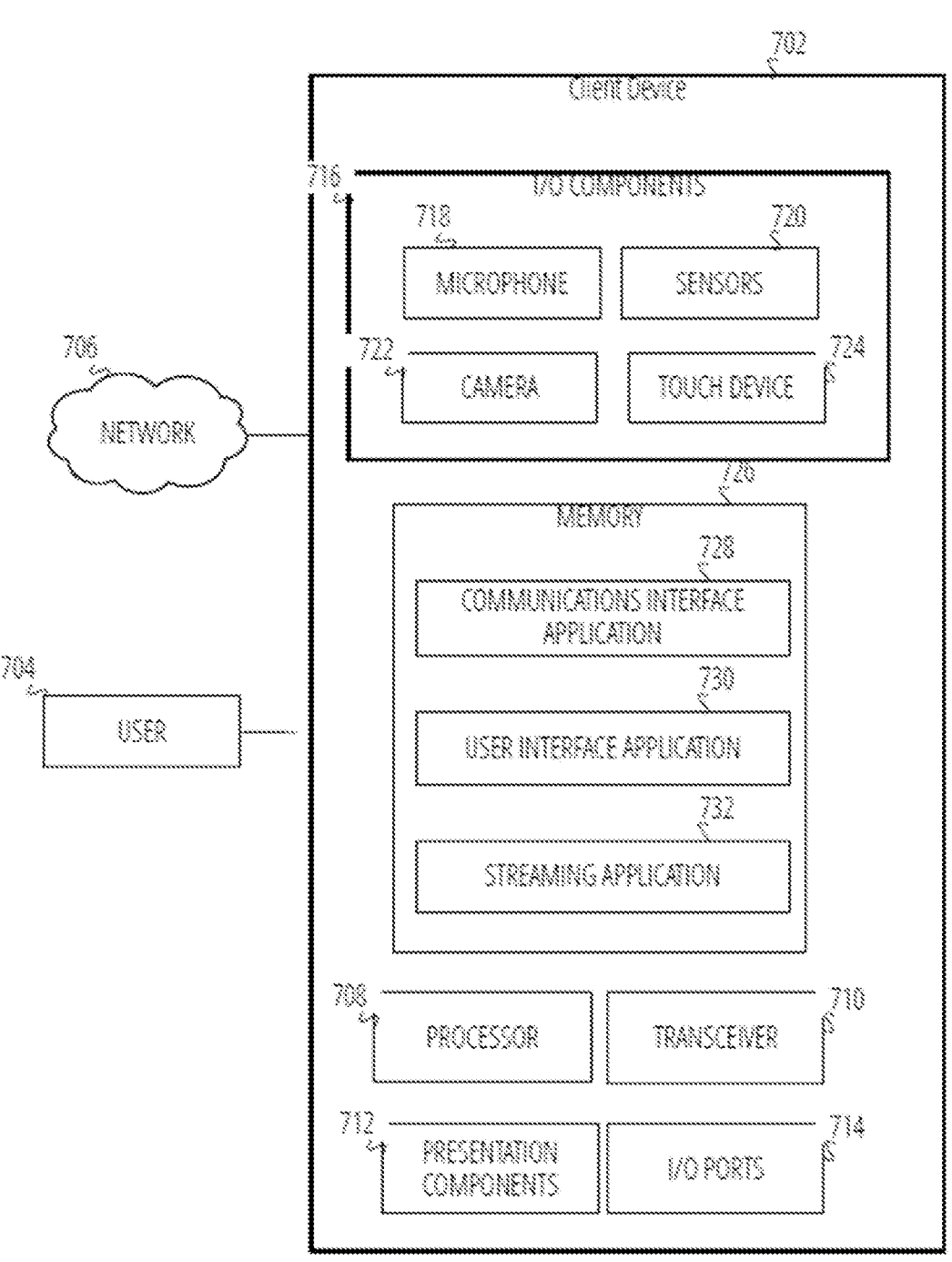
FIG. 7 is a block diagram of an example networked system depicting an environment in which embodiments may operate.

FIG. 7 depicts a block diagram that illustrates an example client device 702 for collecting and providing user and environment data. In some examples, the Client Device 702 has at least one processor 708, a transceiver 710, one or more presentation components 712, one or more input/output I/O ports 714, and a memory 726.

The client device 702 may take the form of a mobile computing device or any other portable device, such as, a mobile telephone, laptop, tablet, computing pad, notebook, gaming device, portable media player, etc. The client device 100 may also include less portable devices such as desktop personal computers, kiosks, tabletop devices, industrial control devices, etc. Other examples may incorporate the client device 702 as part of a multi-device system in which two separate physical devices share or otherwise provide access to the illustrated components of the computing device 702.

The processor 708 may include any quantity of processing units and is programmed to execute computer-executable instructions for implementing aspects of the disclosure. The instructions may be performed by the processor or by multiple processors within the computing device or performed by a processor external to the computing device. In some examples, the processor 708 is programmed to execute methods such as the one illustrated in accompanying FIG. 5-7.

Additionally, or alternatively, some examples may make the processor 708 programmed to present an experience in a user interface ("UI"), e.g., the UI shown in FIGS. 2-4. Moreover, in some examples, the processor 708 may represent an implementation of techniques to perform the operations described herein.

The transceiver 710 is an antenna capable of transmitting and receiving radio frequency ("RF") signals. One skilled in the art will appreciate and understand that various antenna and corresponding chipsets may be used to provide communicative capabilities between the client device 702 and other remote devices. Examples are not limited to RF signaling, however, as various other communication modalities may alternatively be used.

The presentation components 712 visibly or audibly present information on the computing device 100. Examples of presentation components 712 include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user. In some examples, the client device 702 may be a smart phone or a mobile tablet that includes speakers capable of playing audible search results to the user. In other examples, the client device 702 is a computer in a car that audibly presents search responses through a car speaker system, visually presents search responses on display screens in the car, e.g., situated in the car's dashboard, within headrests, on a drop-down screen, or the like, or a combination thereof. Other examples may present the disclosed search responses through various other display or audio presentation components 712.

I/O ports 714 allow the client device 702 to be logically coupled to other devices and I/O components 716, some of which may be built into client device 702 while others may be external. Specific to the examples discussed herein, I/O components 716 include a microphone 718, one or more sensors 720, a camera 722, and a touch device 724. The microphone 718 captures speech from the user 702 and/or speech of or by the user 704. The sensors 720 may include any number of sensors on or in a mobile computing device, electronic toy, gaming console, wearable device, television, vehicle, or other computing device 100. Additionally, the sensors 720 may include an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user 702 or the environment. The camera 722 captures images or video of the user 704. The touch device 724 may include a touchpad, track pad, touch screen, or other touch-capturing device. The illustrated I/O components 716 are but one example of I/O components that may be included on the client device 100. Other examples may include additional or alternative I/O components 716, e.g., a sound card, a vibrating device, a scanner, a printer, a wireless communication module, or any other component for capturing information related to the user or the user's environment. The memory 726 includes any quantity of memory associated with or accessible by the computing device 702. The memory 726 may be internal to the client device 100, as shown in FIG. 7, external to the client device 100, not shown in FIG. 7, or both. Examples of memory 726 may include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the client device 100. The terms computer-readable medium, machine readable medium, and storage device do not include carrier waves to the extent carrier waves are deemed too transitory. Memory 726 may also take the form of volatile and/or nonvolatile memory; may be removable, non-removable, or a combination thereof; and may include various hardware devices, e.g., solid-state memory, hard drives, optical-disc drives, etc. Additionally, or alternatively, the memory 726 may be distributed across multiple client devices 702, e.g., in a virtualized environment in which instruction processing is carried out on multiple client devices 100. The memory 726 stores, among other data, various device applications that, when executed by the processor 708, operate to perform functionality on the computing device 100. Examples of applications may include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 706. For example, the applications may include client-operating applications that correspond to server-side applications executing on remote servers or computing devices in the cloud.

Specifically, instructions stored in memory 726 comprise a communications interface application 728, a user interface application 730, and a streaming application 732. In some examples, the communications interface application 728 includes computer-executable instructions for operating a network interface card and/or a driver for operating the network interface card. Communication between the client device 702 and other devices may occur using any protocol or mechanism over a wired or wireless connection, or across the network 706. In some examples, the communications interface application 728 is operable with RF and short-range communication technologies using electronic tags, such as NFC tags, Bluetooth® brand tags, or the like.

In some examples, the user interface application 730 includes a graphics application for displaying data to the user and receiving data from the user. The user interface application 730 may also include computer-executable instructions for operating the graphics card to display search results and corresponding images or speech on or through the presentation components 712. The user interface application 730 may also interact with the various sensors 720 and camera 722 to both capture and present information through the presentation components 712.

FIG. 8 is a block diagram of a networking environment 800 for providing image search results and recommendations on client device(s) 802. The networking environment 800 may include multiple client devices 802, or just one as shown in FIG. 2, a gameplay ad overlay engine server 808 communicating over a network 806. In some examples, user and environment data are communicated by the client devices 802 over the network 806 to the gameplay ad overlay engine server 808, and the gameplay ad overlay engine server 808 generates overlay streams including personalized ADs that are provided back to the client devices 802 for presentation to their respective users.

The networking environment 800 shown in FIG. 8 is merely an example of one suitable computing system environment and is not intended to suggest any limitation as to the scope of use or functionality of examples disclosed herein. Neither should the illustrated networking environment 800 be interpreted as having any dependency or requirement related to any single component, module, index, or combination thereof.

The network 806 may include any computer network, for example the Internet, a private network, local area network (LAN), wide area network (WAN), or the like. The network 806 may include various network interfaces, adapters, modems, and other networking devices for communicatively connecting the client devices 802 and the gameplay ad overlay engine server 808. The network 806 may also include configurations for point-to-point connections. Computer networks are well known to one skilled in the art, and therefore do not need to be discussed in detail herein.

The client devices 802 may be any type of client device discussed above in reference to FIG. 1. Each client device 802 may capture user and/or environment data from their respective users and communicate the captured user and environment data over the network 806 to the gameplay ad overlay engine server 808. To do so, each device may be equipped with a communications interface application 728, as discussed above in reference to FIG. 7. In response, the gameplay ad overlay engine server 808 may be capable of providing recorded gameplay streams to many client devices 802 capable of communicating their respectively captured user and environment data over the network 806.

The client device 802 may be equipped with various software applications and presentation components 712 for receiving personalized ADs as overlay streams over streamed gameplay streams. For example, a mobile phone may present an ongoing gaming stream of a selected game. Additionally, based on the descriptions herein, an overlay stream may be presented on the mobile phone for concurrent display. The overlay stream may act as a separate layer, or filter, on top of the streaming game to provide a variety of visual indicators. The visual indicators may correspond to ADs. The illustrated client devices and the aforesaid presentation mechanisms are not an exhaustive list covering all examples. Many different variations of client devices 802 and presentation techniques may be used to deliver the overlay stream and the gameplay stream to users.

The gameplay ad overlay engine server 808 represents a server or collection of servers configured to execute different web-service computer-executable instructions. The gameplay ad overlay engine server 808 includes a processor 804 to process executable instructions, a transceiver 810 to communicate over the network 806, and a memory 814 embodied with at least the following executable instructions: an overlay generation module 812, gameplay stream module 816, and a learning module 830. The memory 814 may include instructions for candidate selection module 820, an ad interaction module 824, a machine learning module 826, and a personalization module 828. While gameplay ad overlay engine server 808 is illustrated as a single box, one skilled in the art will appreciate that the gameplay ad overlay engine server 808 may, in fact, be scalable. For example, the gameplay ad overlay engine server 808 may include multiple servers operating various portions of software that collectively generate overlay streams for display on the client devices 802.

The stream overlay module 832 provides backend storage of Web, user, and environment data that may be accessed over the network 806 by the gameplay ad overlay engine server 808 or the client devices 802 and used by the gameplay ad overlay engine server 808 to generate overlay streams. The Web, user, and environment data stored in the database includes, for example but without limitation, user profiles 818, ad selection module 822, and so on. Additionally, though not shown for the sake of clarity, the servers of the stream overlay module 832 may include their own processors, transceivers, and memory. Also, networking environment 800 depicts the database 832 as a collection of separate devices from the gameplay ad overlay engine server 808 however, examples may actually store the discussed Web, user, and environment data shown in the database 832 on the gameplay ad overlay engine server 808.

Herein, a "user profile" refers to an electronically stored collection of information related to the user. Such information may be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile may be built through probing questions to the user or through analyzing the user's behavior on one or more client devices. Additionally, user profiles 818 may include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 818 may be expanded to encompass various other aspects of a user's life.

The present disclosure relates to systems and methods for providing personalized content to a user during gameplay according to at least the examples provided in the sections below:

(A1) In one aspect, some embodiments or examples include a method performed at a client device (e.g., user device 102) in data communication with a network (e.g., network 706). The method includes: determining (e.g., 502) that a user is interacting with a game provided via gameplay video stream by an online streaming provider (e.g., via module 128), identifying (e.g., 504) a first time frame within the game during which the user's interactions with the game are predicted to be below a threshold interaction count (e.g., utilizing module 108), identifying (e.g., 506) a location within the game environment for overlaying content during the first time frame (e.g., space 306), identifying (e.g., 508) content for display to the user (e.g., via module 120), the content to be displayed via an overlay video stream distinct from the gameplay video stream (e.g., via module 118), and in real time of the gameplay, sending (e.g., 510) the overlay video stream to be displayed concurrently with the gameplay stream to provide the content for the user at the location within the game environment during at least a portion of the first time frame (e.g., as illustrated in FIG. 3).

(A2) In some embodiments of A1, the method includes obtaining (e.g., 602) recording of past user gameplay (e.g., from module 106) from a database, identifying, within each recording, past user interactions with the game (e.g., by module 108), each past user interaction having a corresponding game time, aggregating (e.g., 606) the past user interactions (e.g., module 118) to identify time frames as having an aggregated count of user interactions below the threshold interaction count, storing (e.g., 608) the identified time frames (e.g., at module 110) as candidate portions of the gameplay for displaying content, and wherein identifying the first time frame comprises selecting (e.g., 610) the first time frame from the stored time frames.

(A3) In some embodiment of A1-A2, the method includes obtaining (e.g., 602) recordings of past user gameplay from a database, identifying (e.g., 612), from each of the obtained recordings, locations within the game environment that are continuously visible to a respective user during gameplay (e.g., by module 114) for at least a threshold time period, aggregating (e.g., 614) the identified locations to identify a subset of locations having a count within the aggregated identified locations meeting or exceeding a predetermined threshold, and storing (e.g., 616) the subset of locations from the identified locations, wherein identifying the location within the game environment comprises selecting (e.g., 618) the location from the stored subset of locations.

(A4) In some embodiment of A1-A3, the method includes providing the timeframe of the gameplay and the location as inputs to a machine learning model (e.g., at module 112 and/or 118) and receiving a potential candidate location and placement of content for display to the user.

(A5) In some embodiment of A1-A4, the method includes identifying the location (e.g., by module 114 and/or 116) as having an area of homogenous pixel coloration for the threshold time period, and identifying the location as being within a user's field of vision.

(A6) In some embodiment of A1-A5, the method includes obtaining one or more interests of the user (e.g., via module 122), selecting content (e.g., via module 120) corresponding to at least one of the one or more interests, and modifying (e.g., via module 118) the selected content to conform to a size of the identified location.

(A7) In some embodiment of A1-A6, the method includes identifying an object (e.g., 310, FIG. 3) within the game environment that is traditionally used as a medium for displaying content and designating the object as the location.

In yet another aspect, some embodiments include a non-transitory computer-readable storage medium storing one or more programs for execution by one or more processors of a storage device, the one or more programs including instructions for performing any of the methods described herein (e.g., A1-A7 described above).

In yet another aspect, a system, comprising: a processor; and a memory device coupled to the processor and having a program stored thereon for execution by the processor to perform operations comprising any of the methods of A1-A7 described above.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The invention claimed is:

1. A method of providing content to a user during gameplay, comprising:

determining that a user is interacting with a game provided via gameplay video stream by an online streaming provider;

identifying a first time frame within the game during which the user's interactions with the game are predicted to be below a threshold interaction count;

identifying a location within a game environment of the game for overlaying content during the first time frame;

identifying content for display to the user, the content to be displayed via an overlay video stream distinct from the gameplay video stream;

processing, by a GPU-based engine, overlay candidate information and selected content to generate an overlay stream, the processing comprising inserting the content into successive gameplay frames using frame identifiers and presentation timestamps, and calculating the timing for placement of the overlay stream for viewing by the user at the same time the game is being played;

encoding, by a low-latency streaming encoder, the overlay stream for transmission;

synchronizing the encoded overlay stream with the gameplay stream to maintain real-time concurrent presentation; and in real time of the gameplay, sending the overlay video stream to be displayed concurrently with the gameplay stream to provide the content for the user at the location within the game environment during at least a portion of the first time frame, wherein the overlay stream and the gameplay stream are provided as separate video streams to the user device and are matched using a stream synchronization algorithm.

2. The method of claim 1, further comprising:

obtaining recording of past user gameplay from a database;

identifying, within each recording, past user interactions with the game, each past user interaction having a corresponding game time;

aggregating the past user interactions to identify time frames as having an aggregated count of user interactions below the threshold interaction count; and storing the identified time frames as candidate portions of the gameplay for displaying content;

wherein identifying the first time frame comprises selecting the first time frame from the stored time frames.

3. The method of claim 1, further comprising:

obtaining recordings of past user gameplay from a database;

identifying, from each of the obtained recordings, locations within the game environment that are continuously visible to a respective user during gameplay for at least a threshold time period;

aggregating the identified locations to identify a subset of locations having a count within the aggregated identified locations meeting or exceeding a predetermined threshold; and storing the subset of locations from the identified locations;

wherein identifying the location within the game environment comprises selecting the location from the stored subset of locations.

4. The method of claim 3, further comprising:

providing the first time frame of the gameplay and the location as inputs to a machine learning model; and receiving a potential candidate location and placement of content for display to the user.

5. The method of claim 3, further comprising:

identifying the location as having an area of homogenous pixel coloration for the threshold time period; and identifying the location as being within a user's field of vision.

6. The method of claim 1, further comprising:

obtaining one or more interests of the user;

selecting content corresponding to at least one of the one or more interests; and modifying the selected content to conform to a size of the identified location.

7. The method of claim 1, further comprising:

identifying an object within the game environment that is traditionally used as a medium for displaying content; and designating the object as the location.

8. A system comprising one or more processors and a storage medium storing instructions that, when executed, cause the one or more processors to carry out the method of claim 1.

9. A machine-readable medium carrying instructions, which when executed by one or more processors, cause the one or more processors to carry out the method of claim 1.

10. A system for providing content to a user during gameplay, comprising:

means for determining that a user is interacting with a game provided via gameplay video stream by an online streaming provider;

means for identifying a first time frame within the game during which the user's interactions with the game are predicted to be below a threshold interaction count;

means for identifying a location within a game environment of the game for overlaying content during the first time frame;

means for identifying content for display to the user, the content to be displayed via an overlay video stream distinct from the gameplay stream;

a GPU-based engine for processing overlay candidate information and selected content to generate an overlay stream, the processing comprising inserting the content into successive gameplay frames using frame identifiers and presentation timestamps, and calculating the timing for placement of the overlay stream for viewing by the user at the same time the game is being played;

a low-latency streaming encoder for encoding the overlay stream for transmission;

means for synchronizing the encoded overlay stream with the gameplay stream to maintain real-time concurrent presentation; and means for sending, in real time of the gameplay, the overlay video stream to be displayed concurrently with the gameplay stream to provide the content for the user at the location within the game environment during at least a portion of the first time frame, wherein the overlay stream and the gameplay stream are provided as separate video streams to the user device and are matched using a stream synchronization algorithm.

11. The system of claim 10, wherein the means for identifying the first time frame further comprises means for;

obtaining recording of past user gameplay from a database;

identifying, within each recording, past user interactions with the game, each past user interaction having a corresponding game time;

aggregating the past user interactions to identify time frames as having an aggregated count of user interactions below the threshold interaction count;

storing the identified time frames as candidate portions of the gameplay for displaying content; and selecting the first time frame from the stored time frames.

12. The system of claim 10, wherein the means for identifying the first time frame further comprises means for:

identifying the location within a frame of the game for overlaying content further comprises:

obtaining recordings of past user gameplay from a database;

identifying, from each of the obtained recordings, locations within the game environment that are continuously visible to a respective user during gameplay for at least a threshold time period;

aggregating the identified locations to identify a subset of locations having a count within the aggregated identified locations meeting or exceeding a predetermined threshold;

storing the subset of locations from the identified locations; and selecting the location from the stored subset of locations.

13. The system of claim 12, further comprising:

means for providing the first time frame of the gameplay and the location as inputs to a machine learning model; and means for receiving a potential candidate location and placement of content for display to the user.

14. The system of claim 12, further comprising:

means for identifying the location as having an area of homogenous pixel coloration for the threshold time period; and means for identifying the location as being within a user's field of vision.

15. The system of claim 10, wherein the means for identifying the location within a frame of the game for overlaying content further comprises:

means for identifying an object within the game environment that is traditionally used as a medium for displaying content; and means for designating the object as the location.

* * * * *